United States Patent [19]

Abe

[11] Patent Number: 5,313,274
[45] Date of Patent: May 17, 1994

[54] COLOR SIGNAL MATRIX CIRCUIT

[75] Inventor: Masato Abe, Kawasaki, Japan

[73] Assignee: Fujitsu Limited, Japan

[21] Appl. No.: 747,856

[22] Filed: Aug. 20, 1991

[30] Foreign Application Priority Data

Aug. 21, 1990 [JP] Japan .................................. 2-220551

[51] Int. Cl.$^5$ .............................................. H04N 9/67
[52] U.S. Cl. ............................................... 358/21 R
[58] Field of Search ..................... 358/21 R, 30, 13 C; H04N 9/67

[56] References Cited

U.S. PATENT DOCUMENTS

| | | | |
|---|---|---|---|
| 4,891,689 | 6/1990 | Senda et al. | 358/30 |
| 4,937,774 | 6/1990 | Malinowski | 364/724.12 |

FOREIGN PATENT DOCUMENTS

| | | |
|---|---|---|
| 0069541 | 1/1983 | European Pat. Off. . |
| 0148705 | 7/1985 | European Pat. Off. . |
| 0286184 | 10/1988 | European Pat. Off. . |
| 58-186290 | 10/1983 | Japan . |
| WO9013866 | 11/1990 | PCT Int'l Appl. . |
| 1579738 | 11/1980 | United Kingdom . |
| 2226899 | 7/1990 | United Kingdom . |

*Primary Examiner*—Ulysses Weldon
*Assistant Examiner*—Minsun Oh
*Attorney, Agent, or Firm*—Welsh & Katz, Ltd.

[57] ABSTRACT

In a matrix operation apparatus for calculating output signals by multiplying input signals with coefficients, a plurality of matrix element calculating circuits multiply the input signals with corresponding coefficients to obtain matrix elements. An output calculating circuit adds and subtracts the obtained matrix elements to obtain one of the output signals. In this case, the coefficients are changed by a coefficient changing circuit which also controls the output calculating circuit, and thus the output calculating circuit generates the plurality of output signals in a time-divisional manner.

7 Claims, 15 Drawing Sheets

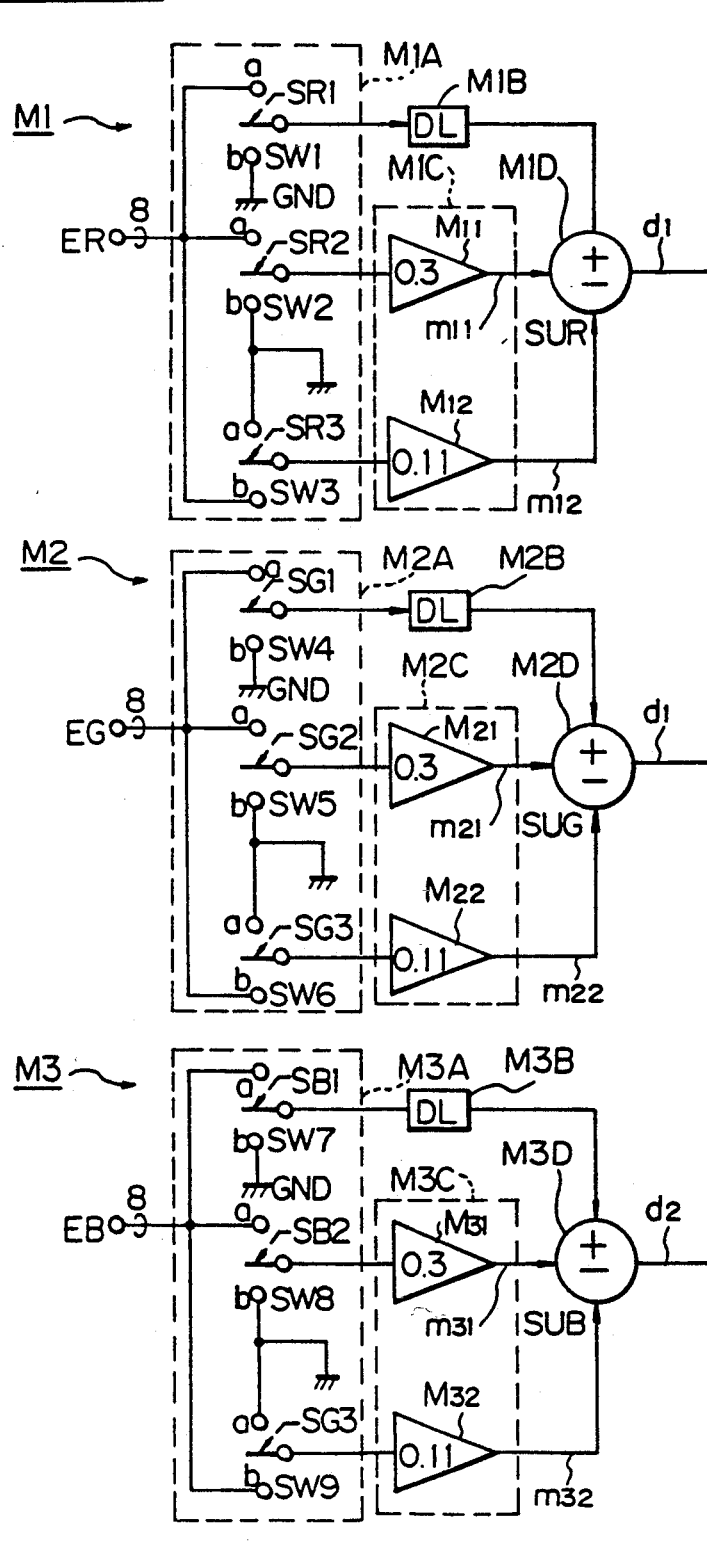

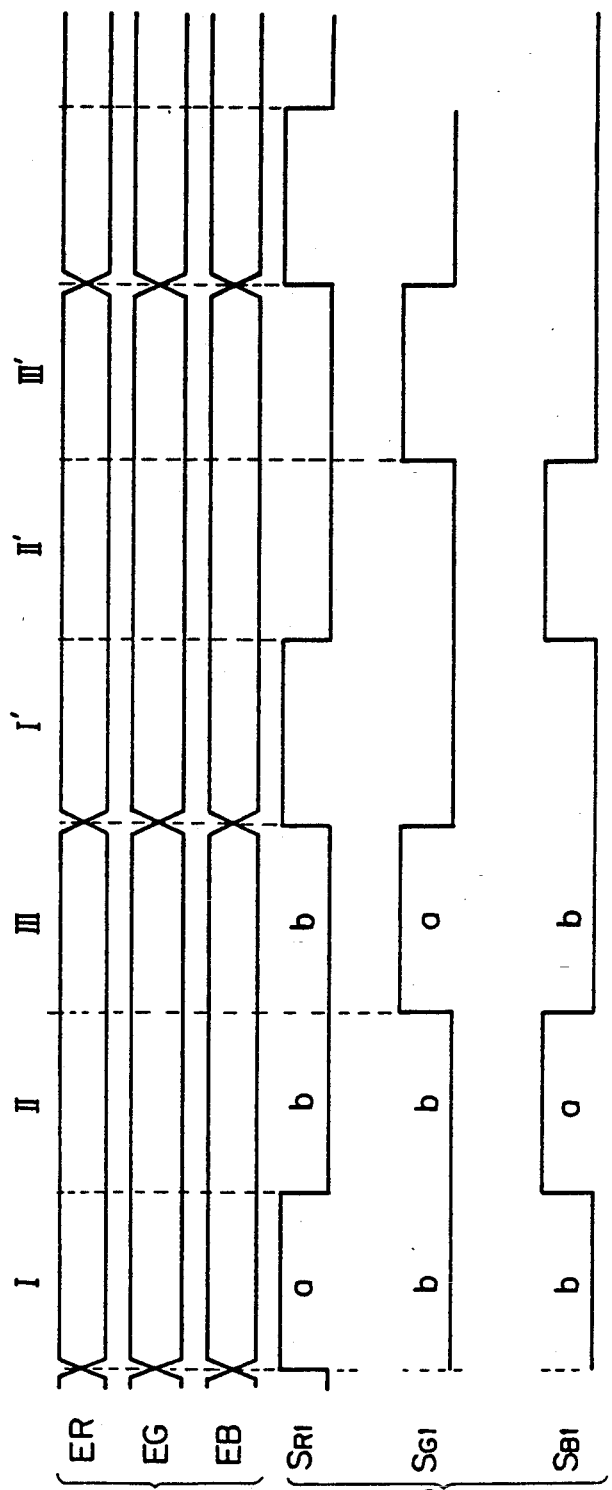

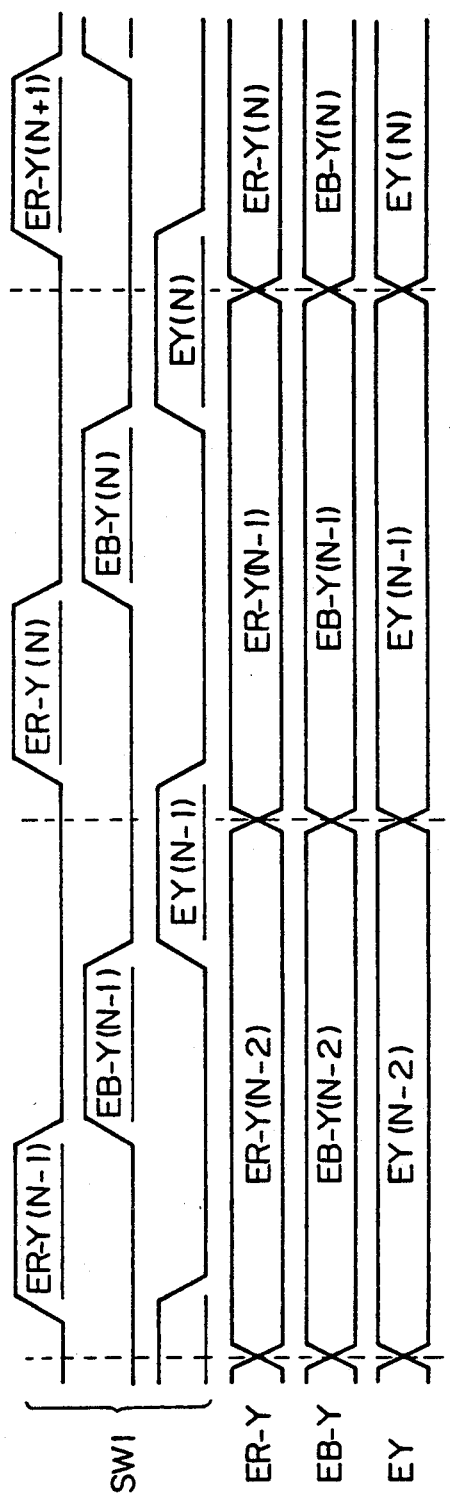

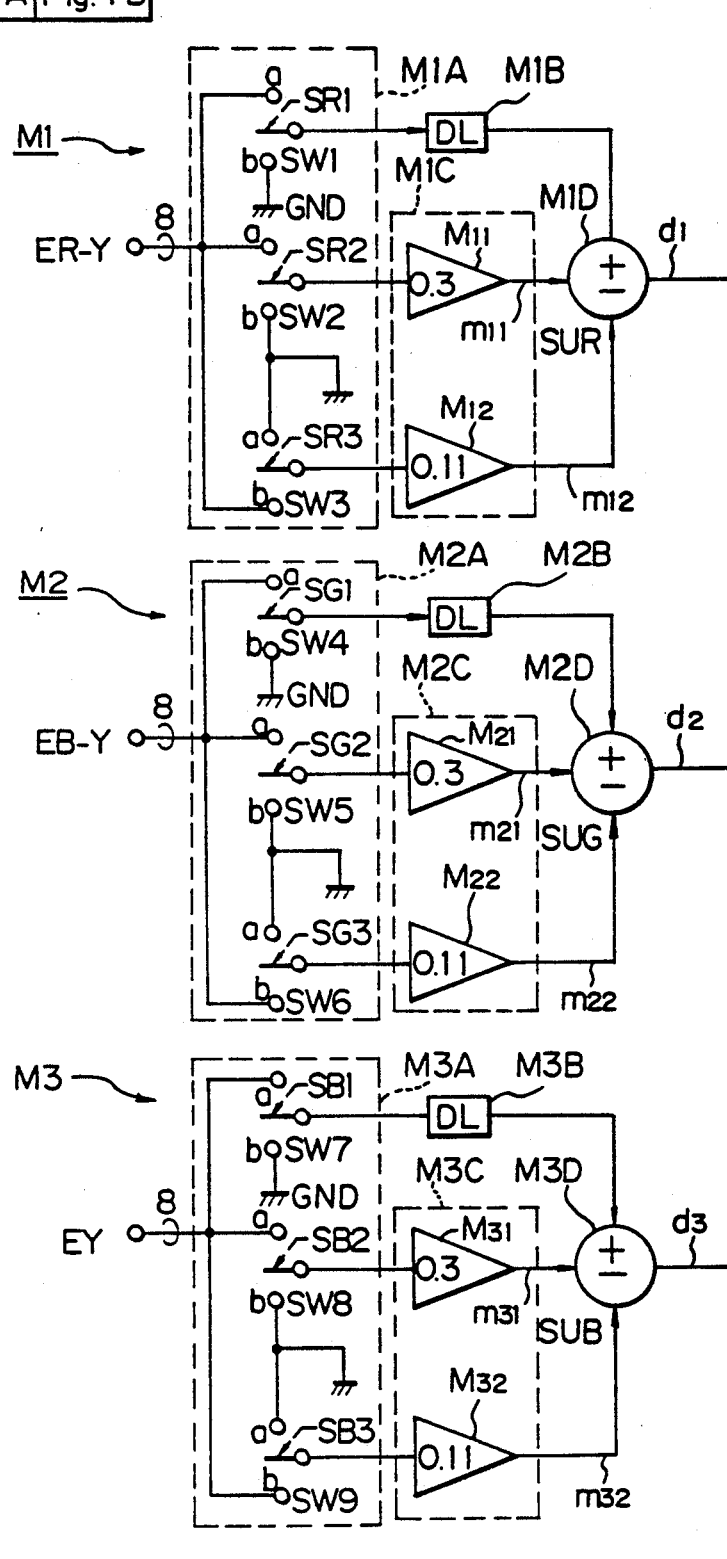

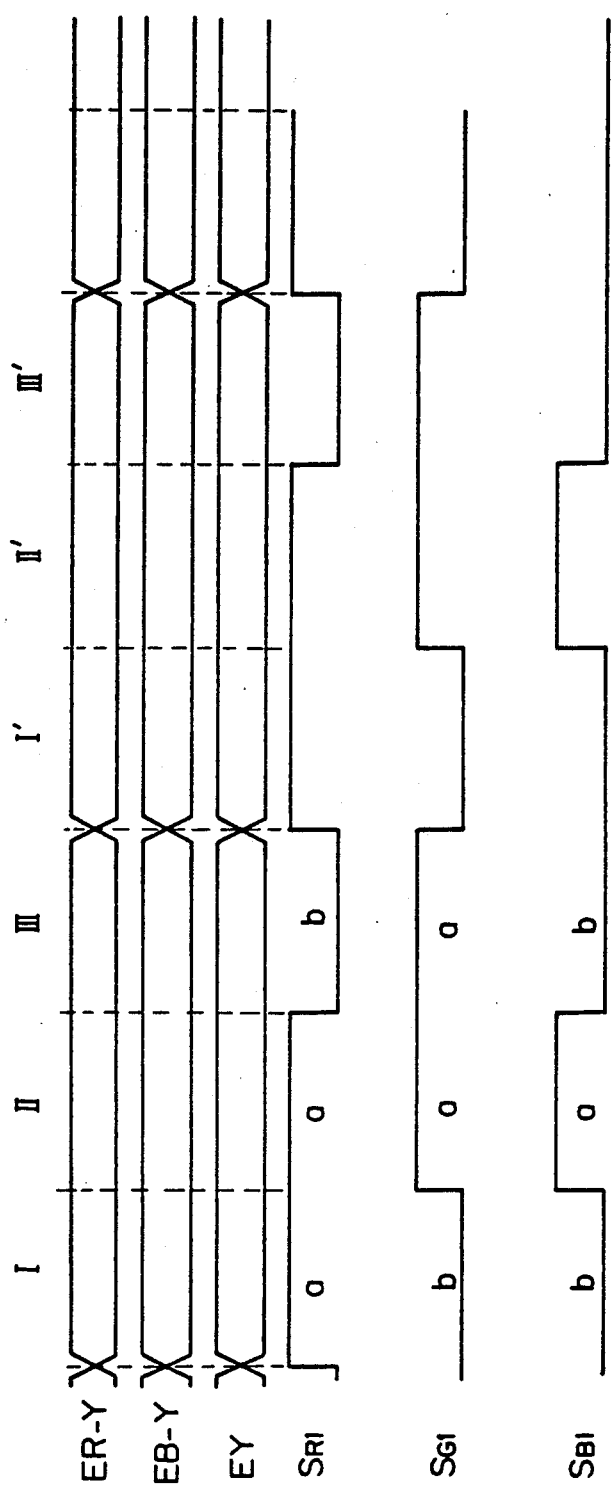

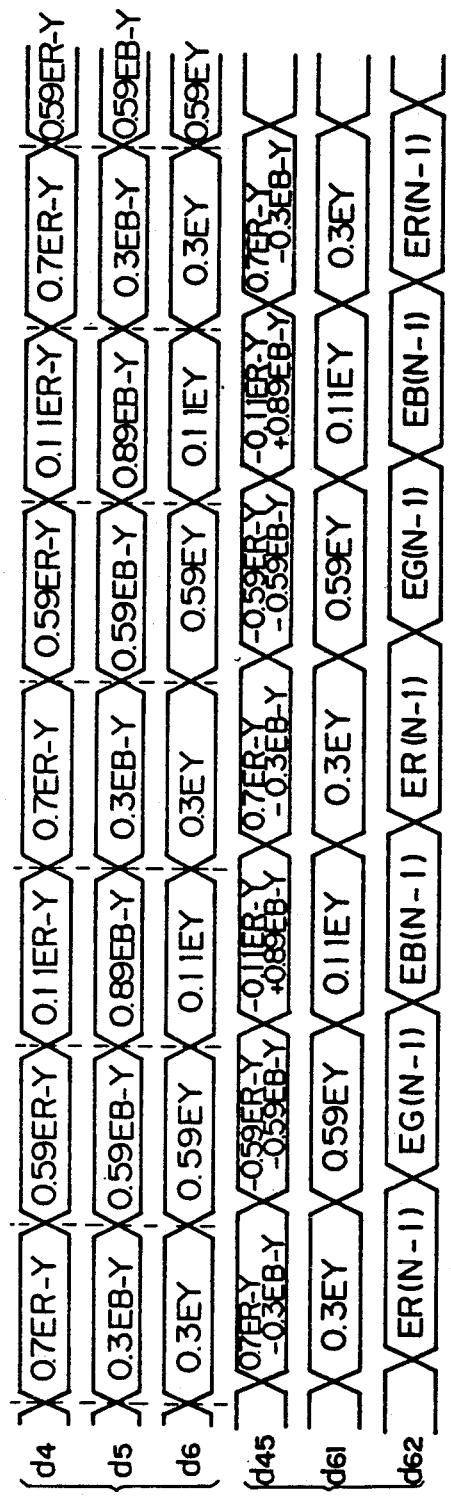

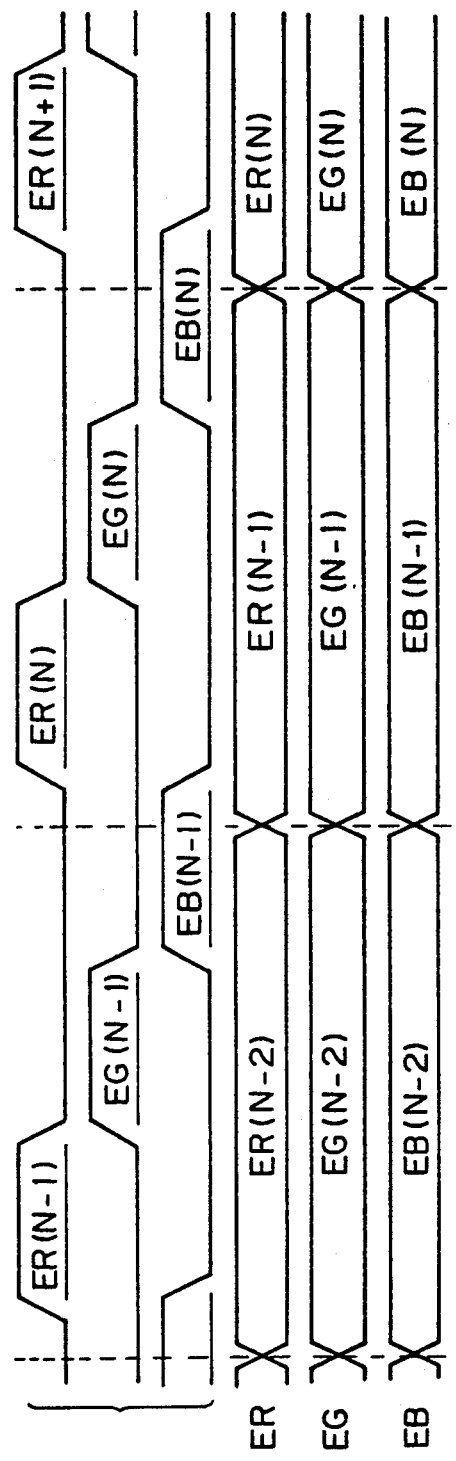

COLOR SIGNAL MATRIX CIRCUIT

BACKGROUND OF THE INVENTION

1) Field of the Invention

The present invention relates to a matrix operation apparatus which can be applied to a matrix operation circuit for modulation and an inverse-matrix operation circuit for demodulation in a National Television Systems Committee (NTSC) system.

2) Description of the Related Art

Recently, in line with the advances made in image processor systems for high resolution television, video cameras, video units, and the like, a matrix circuit for modulation of color signals and an inverse-matrix circuit for demodulation of the modulated signals have been formed by digital semiconductor integrated circuits.

For example, in a modulation circuit of a transmitter, three color signals, i.e., a red signal, a green signal, and a blue signal are converted into two color difference signals and a brightness signal. In a demodulation circuit of a receiver, however, the two color difference signals, and the brightness signal are converted into three color signals.

In a prior art system, however, a matrix operation apparatus for a modulation circuit and an inverse-matrix operation apparatus for a demodulation circuit are individually designed, thus increasing the manufacturing cost. Also, the matrix operation apparatus and the inverse operation apparatus per se are complex, thus further increasing the manufacturing cost, which will be later explained in detail.

Note that such an inverse-matrix operation apparatus is a kind of matrix operation apparatus.

SUMMARY OF THE INVENTION

Therefore, an object of the present invention is to simplify a matrix operation apparatus to thereby reduce the manufacturing cost thereof.

According to the present invention, a matrix operation apparatus for calculating output signals by multiplying input signals with coefficients, a plurality of matrix element calculating circuits multiply the input signals with corresponding coefficients to obtain matrix elements. An output calculating circuit adds and subtracts the obtained matrix elements to obtain one of the output signals. In this case, the coefficients are changed by a coefficient changing circuit which also controls the output calculating circuit, and thus the output calculating circuit generates the plurality of output signals in a time-divisional manner.

In the present invention, many of the circuits are made common and are simplified, to thereby reduce the manufacturing cost.

BRIEF DESCRIPTION OF THE DRAWINGS

The present invention will be more clearly understood from the description set forth below, with reference to the accompanying drawings, wherein:

FIGS. 5A and 5B depict a circuit diagram illustrating a matrix operation apparatus for modulation in an NTSC system to which the apparatus of FIG. 4 is applied;

FIGS. 6A through 6H are timing diagrams showing the operation of the apparatus of FIG. 5;

FIGS. 7A and 7B depict a circuit diagram illustrating an inverse-matrix operation apparatus for demodulation in an NTSC system to which the apparatus of FIG. 4 is applied; and FIGS. 8A through 8H are timing diagrams showing the operation of the apparatus of FIG. 7.

DESCRIPTION OF THE PREFERRED EMBODIMENTS

Before the description of embodiments of the present invention, prior art matrix operation apparatuses will be explained with reference to FIGS. 1, 2, and 3.

Figure 1:
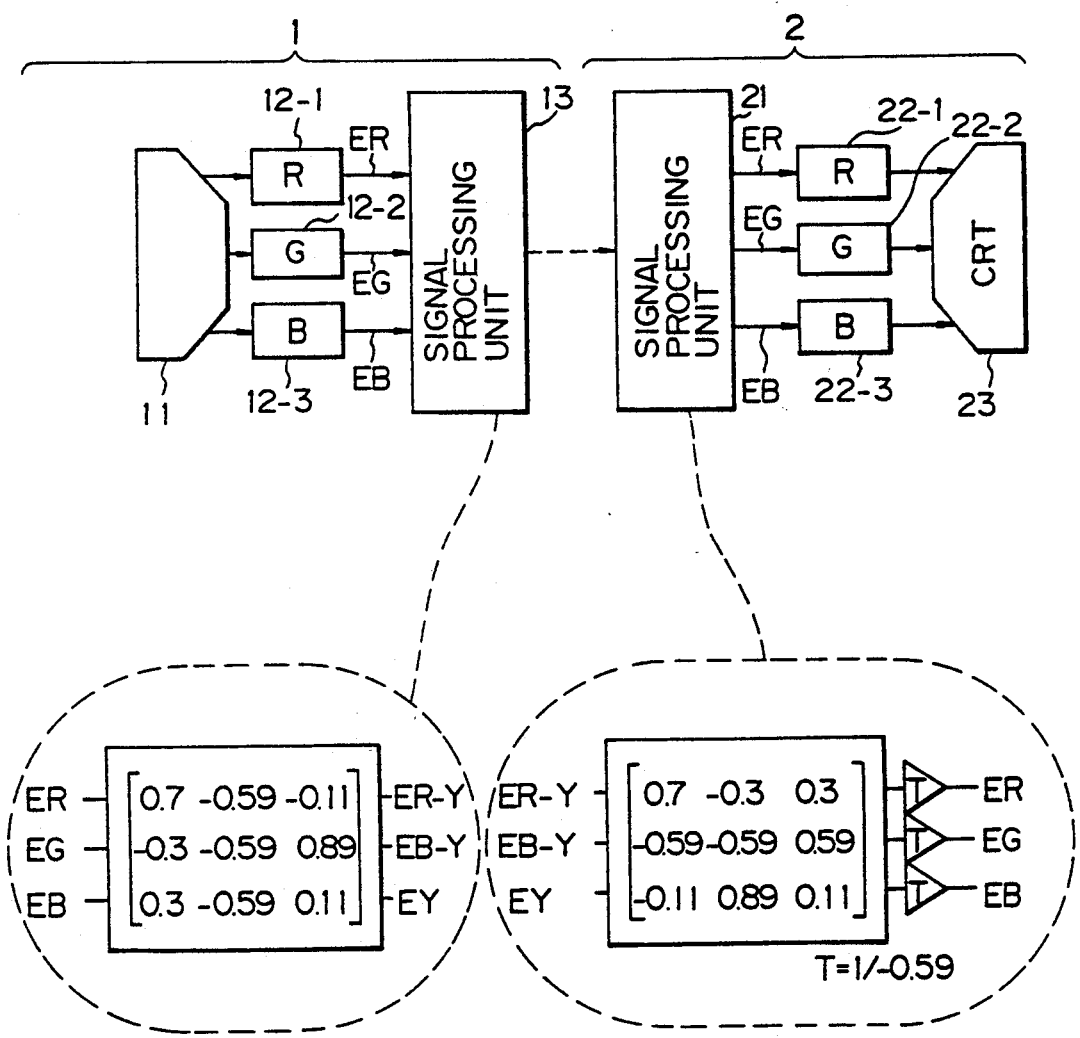
FIG. 1 is a schematic view illustrating a general image processing system.

In FIG. 1, which illustrates a general NTSC system, 1 designates a camera system, and 2 designates a reproduction system. The camera system 1 includes a spectrum prism 11, optical systems 12-1, 12-2, and 12-3, formed by color filters and camera tubes (CCD), and a signal processing unit 13. The optical systems 12-1, 12-2, and 12-3 generate a red signal ER, a green signal EG, and a blue signal EB, respectively, which are converted into digital signals and are transmitted to the signal processing unit 13.

In the signal processing unit 13, the following matrix operation is carried out:

$$\begin{bmatrix} ER - Y \\ EB - Y \\ EY \end{bmatrix} = \begin{bmatrix} 0.7 & -0.59 & -0.11 \\ -0.3 & -0.59 & 0.89 \\ 0.3 & -0.59 & 0.11 \end{bmatrix} \begin{bmatrix} ER \\ EG \\ EB \end{bmatrix}$$

The obtained color difference signals ER-Y and EB-Y, and the brightness signal EY are transmitted to the reproduction system 2.

The reproduction system 2 includes a signal processing unit 21, color amplifiers 22-1, 22-2, and 22-3, and a CRT.

In the signal processing unit 21, the following inverse-matrix operation is carried out:

$$\begin{bmatrix} ER \\ EG \\ EB \end{bmatrix} = \begin{bmatrix} 0.7 & -0.3 & 0.3 \\ -0.59 & -0.59 & 0.59 \\ -0.11 & 0.89 & 0.11 \end{bmatrix} \begin{bmatrix} ER - Y \\ EB - Y \\ EY \end{bmatrix}$$

Here, $$\begin{bmatrix} 0.7 & -0.59 & -0.11 \\ -0.3 & -0.59 & 0.89 \\ 0.3 & -0.59 & 0.11 \end{bmatrix} \begin{bmatrix} 0.7 & -0.3 & 0.3 \\ -0.59 & -0.59 & 0.59 \\ -0.11 & 0.89 & 0.11 \end{bmatrix} = \begin{bmatrix} 1 & 0 & 0 \\ 0 & 1 & 0 \\ 0 & 0 & 1 \end{bmatrix}$$

The digital output signals of the signal processing unit 21 are converted into analog signals which are transmitted to the color amplifiers 22-1, 22-2, and 22-3.

Figure 2:
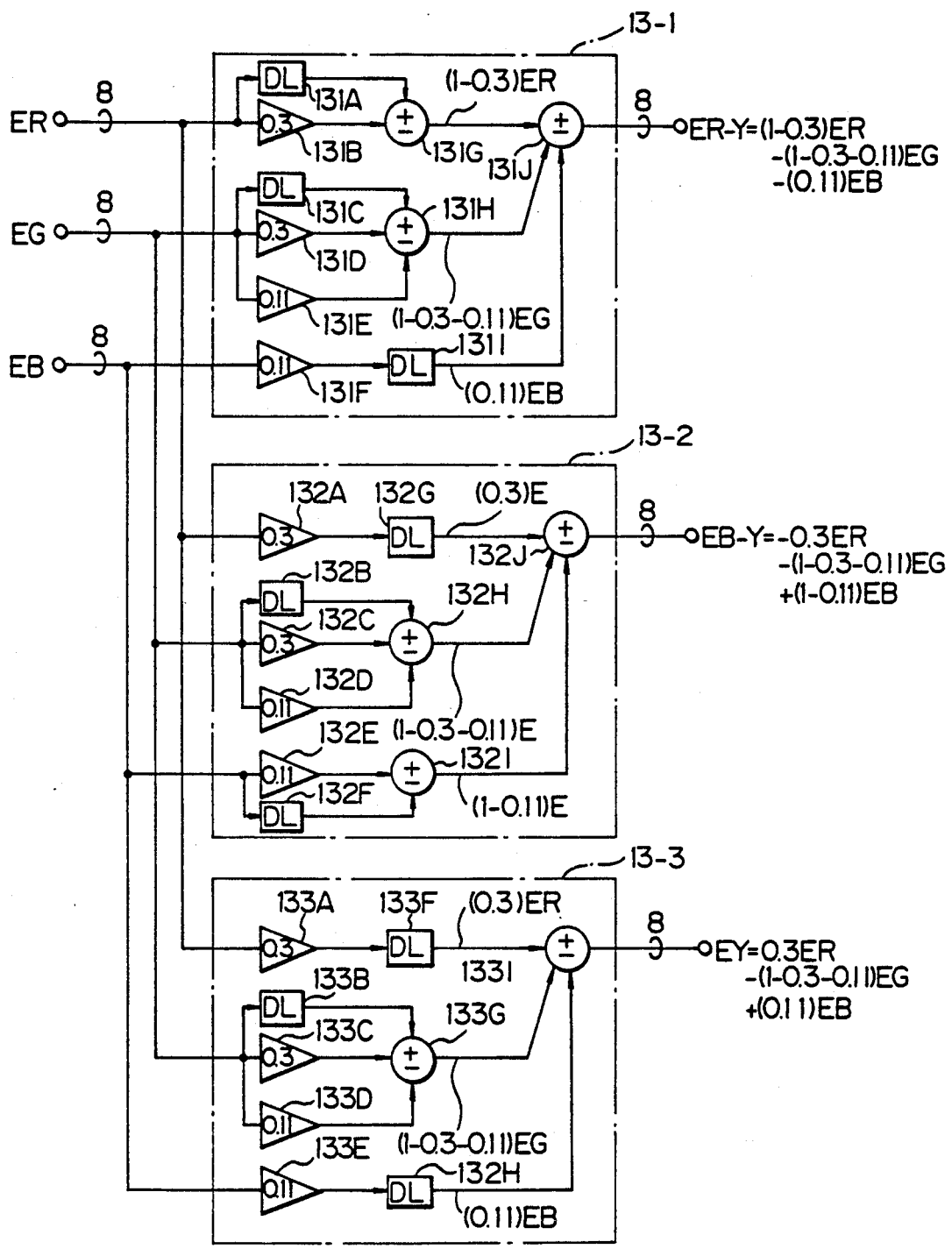
FIG. 2 is a circuit diagram illustrating a prior art matrix operation apparatus.

In FIG. 2, which illustrates a prior art matrix operation apparatus in the signal processing unit 13 of FIG. 1, three matrix element calculating circuits, i.e., two color difference calculating circuits 13-1 and 13-2, and a brightness calculating circuit 13-3 are provided.

The color difference calculating circuit 13-1 is formed by a delay circuit 131A, a multiplier 131B having a coefficient of 0.3, a delay circuit 131C, a multiplier 131D having a coefficient of 0.3, a multiplier 131E having a coefficient of 0.11, a multiplier 131F having a coefficient of 0.11, an adder/subtracter 131G, an adder/subtracter 131H, a delay circuit 131T, and an adder/subtracter 131J. As a result, the color difference calculating circuit 13-1 generates a color difference signal $$\begin{aligned} ER - Y &= (1 - 0.3) \cdot ER - \\ & (1 - 0.3 - 0.11) \cdot EG - 0.11 \cdot EB \\ &= 0.7 \cdot ER - 0.59 \cdot EG - 0.11 \cdot EB. \end{aligned}$$

Note that a delay time of the delay circuits 131A and 131C corresponds to that of the multipliers 131B, 131D, and 131F, and a delay time of the delay circuit 131I corresponds to that of the adder/subtracters 131G and 131H.

Similarly, the color difference calculating circuit 13-2 is formed by a multiplier 132A having a coefficient of 0.3, a delay circuit 132B, a multiplier 132C having a coefficient of 0.3, a multiplier 132D having a coefficient of 0.11, a multiplier 132E having a coefficient of 0.11, delay circuits 132F and 132G, adder/subtracters 132H, 132I, and 132J. As a result, the color difference calculating circuit 13-2 generates a color difference signal $$\begin{aligned} EB - Y &= -0.3ER - \\ & (1 - 0.3 - 0.11) \cdot EG + \\ & (1 - 0.11) \cdot EB \\ &= -0.3 \cdot ER - 0.59 \cdot EG + 0.89 \cdot ER. \end{aligned}$$

Note that a delay time of the delay circuits 132B and 132F correspond to that of the multipliers 132B, 132C, 131D, and 131E, and a delay time of the delay circuit 132G corresponds to that of the adder/subtracters 132H and 132I.

Also, the brightness calculating circuit 13-3 is formed by a multiplier 133A having a coefficient of 0.3, a delay circuit 133B, a multiplier 133C having a coefficient of 0.3, a multiplier 133DE having a coefficient of 0.11, a multiplier 133E having a coefficient of 0.11, a delay circuit 133F, an adder/subtracter 133G, a delay circuit 133H, and an adder/subtracter 131I. As a result, the brightness calculating circuit 13-3 generates a brightness signal EY $$\begin{aligned} EY &= 0.3 \cdot ER - \\ & (1 - 0.3 - 0.11) \cdot EG + \\ & 0.11 \cdot EB \\ &= 0.3 \cdot ER - 0.59 \cdot EG + 0.11 \cdot EB \end{aligned}$$

Note that a delay time of the delay circuit 133C corresponds to that of the multipliers 133A, 133C, 133D, and 133E, and a delay time of the delay circuits 133F and 133H corresponds to that of the adder/subtracter 133G.

Figure 3:
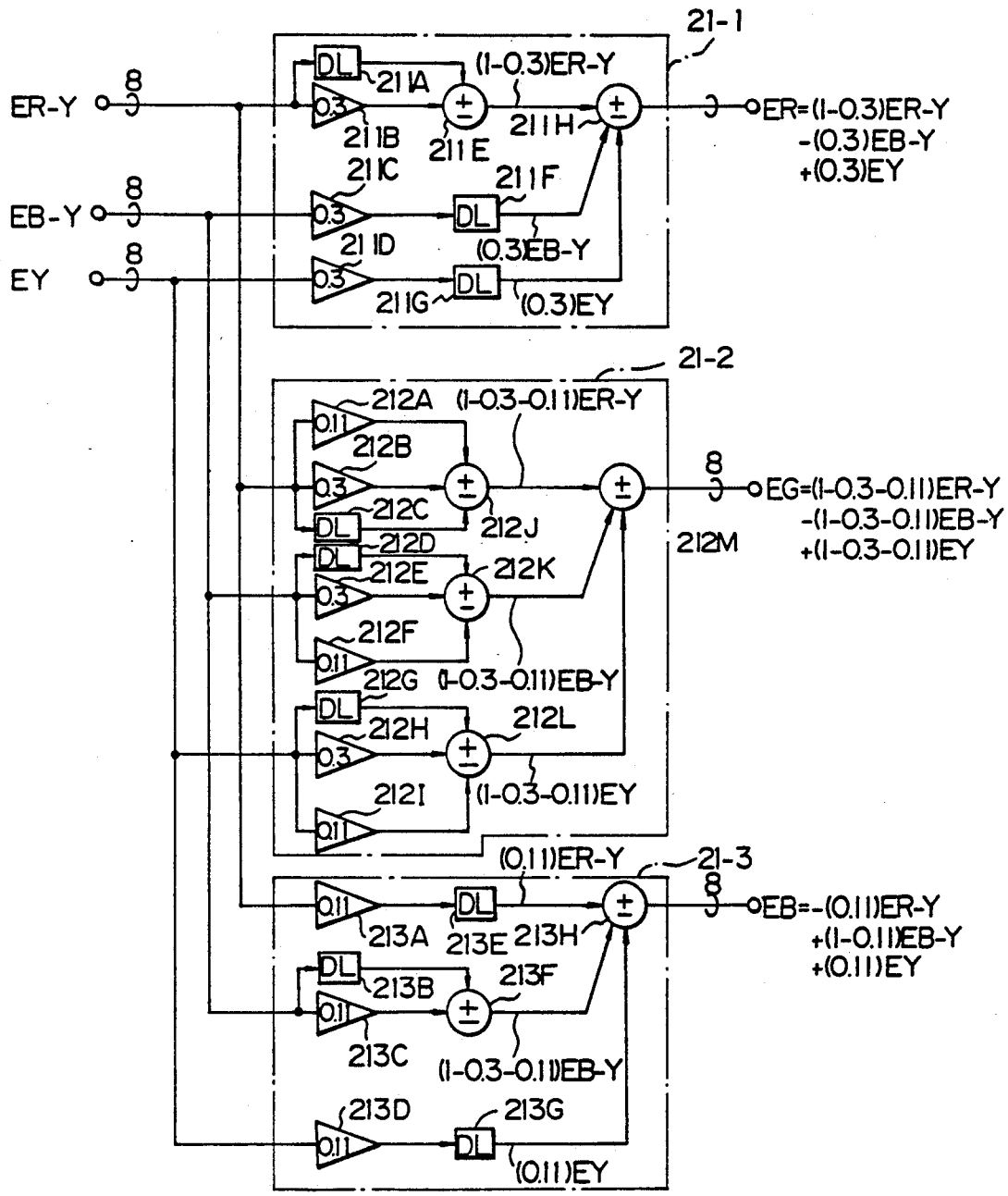
FIG. 3 is a circuit diagram illustrating a prior art inverse-matrix operation apparatus.

In FIG. 3, which illustrates a prior art inverse-matrix operation apparatus in the signal processing unit 21 of FIG. 1, three matrix element calculating circuits, i.e., a red signal demodulating circuit 21-1, a green signal demodulating circuit 21-2, and a blue signal demodulating circuit 21-3, are provided.

The red signal demodulating circuit 21-1 is formed by a delay circuit 211A, multipliers 211B, 211C, and 211D having an adder/subtracter 211E, delay circuits 211F and 211G, and an adder/subtraction 211H. As a result, the red signal demodulating circuit 21-1 generates an intermediate red signal $$\begin{aligned} ER &= (1 - 0.3) \cdot ER - Y - \\ & 0.3 \cdot EB - Y + \\ & 0.3 \cdot EY \\ &= 0.7 \cdot ER - Y - 0.3 \cdot ER - Y + 0.3 \cdot EY \end{aligned}$$

Then, the intermediate red signal is corrected by $T = 1/(-0.59)$ to obtain a red signal ER.

Note that a delay time of the delay circuit 211A corresponds to that of the multipliers 211B, 211C, and 211D, and a delay time of the delay circuits 211F and 211G corresponds to that of the adder/subtracter 211E.

Similarly, the green color demodulating circuit 21-2 is formed by a delay circuit 212A, a multiplier 212B having a coefficient of 0.3, delay circuits 212C and 212D, a multiplier 212E having a coefficient of 0.3, a multiplier 212F having a coefficient of 0.11, a delay circuit 212G, a multiplier 212H having a coefficient of 0.3, a multiplier 212I having a coefficient of 0.11, adder/subtracters 212J, 212K, 212L, and 212M. As a result, the green signal demodulating circuit 21-2 generates an intermediate green signal $$\begin{aligned} EG &= (1 - 0.3 - 0.11)ER - Y - \\ & (1 - 0.3 - 0.11)EB - Y + \\ & (1 - 0.3 - 0.11)EY \\ &= 0.59 \cdot ER - Y - 0.59 \cdot EB - Y + 0.59 \cdot EY \end{aligned}$$

Then, the intermediate green signal is corrected by $T = 1/(-0.59)$ to obtain a green signal EG.

Note that a delay time of the delay circuits 212C, 212D, 212G correspond to that of the multipliers 212A, 212B, 212E, 212F, 212H, and 212I.

Also, the blue signal demodulating circuit 21-3 is formed by a multiplier 213A having a coefficient of 0.11, a delay circuit 213B, multipliers 213C and 213D having a coefficient of 0.11, a delay circuit 213E, an adder/subtracter 213F, a delay circuit 213G, and an adder/subtractor 213H. As a result, the blue signal demodulating circuit 21-3 generates an intermediate blue signal $$\begin{aligned} EB &= -0.11 \cdot ER - Y + \\ &= (1 - 0.11) \cdot EB - Y + \\ & 0.11 \cdot EY \\ &= -0.11ER - Y + 0.89EB - Y + 0.11EY \end{aligned}$$

Then, the intermediate blue signal is corrected by $T = 1/(-0.59)$ to obtain a blue signal EB.

The matrix operation apparatus of FIG. 2 and the inverse-operation apparatus of FIG. 3 include a large number of the same components, such as the multiplier having a coefficient of 0.3, the multiplier having a coefficient of 0.11, and the adder/subtracter, which increase the size of the apparatus. Also, the matrix operation apparatus of FIG. 2 is quite different from the inverse-matrix operation apparatus of FIG. 3, thus increasing the manufacturing costs thereof.

Figures 4, 4A:
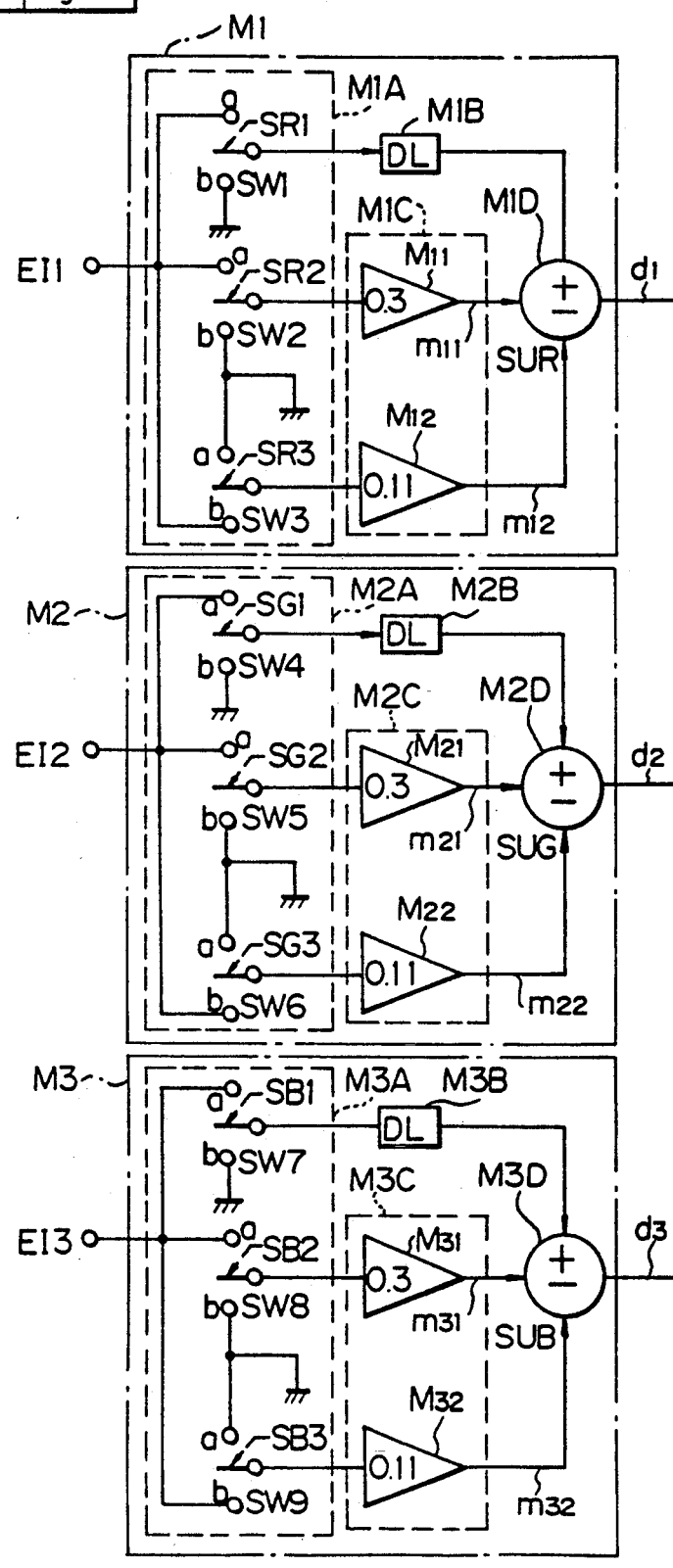
FIGS. 4A and 4B depict a circuit diagram illustrating an embodiment of the matrix operation apparatus according to the present invention.

In FIG. 4, which illustrates an embodiment of the matrix operation apparatus according to the present invention, references M1, M2, and M3 designate matrix element calculating circuits for receiving three input signals EI1, EI2, and EI3, respectively, and generating matrix elements $d_1$, $d_2$, and $d_3$ using coefficients $a1=1$, $a2=0.3$, and $a3=0.11$.

The matrix element calculating circuit M1 is formed by a switching circuit M1A, a delay circuit M1B which has the coefficient a1 ($=1$), a multiplier circuit M1C including two multipliers $M_{11}$ and $M_{12}$ having coefficients $a2=0.3$ and $a3=0.11$, and an adder/subtracter M1D.

The switching circuit M1A has three switches SW1, SW2, and SW3 (such as MOS switches), each of which is connected between an input terminal for the input signal EI1 and the ground terminal. The switches SW1, SW2, and SW3 are controlled by control-signals SR1, SR2, and SR3, respectively, supplied from a timing control circuit 4.

The adder/subtracter M1D performs an additional subtraction operation upon the input signal EI1 with outputs m11 and m12 of the multipliers $M_{11}$ and $M_{12}$ in accordance with a control signal SUR supplied from the timing control circuit 4.

Similarly, the matrix element calculating circuit M2 is formed by a switching circuit M2A, a delay circuit M2B which has the coefficient a1 ($=1$), a multiplier circuit M2C including two multipliers $M_1$ and $M_2$ having coefficients $a2=0.3$ and $a3=0.11$, and an adder/subtracter M2D.

The switching circuit M2A has three switches SW4, SW5, and SW6 (such as MOS switches), each of which is connected between an input terminal for the input signal EI2 and the ground terminal. The switches SW4, SW5, and SW6 are controlled by control-signals SG1, SG2, and SG3, respectively, supplied from the timing control circuit 4.

The adder/subtracter M2D performs an additional subtraction operation upon the input signal EI2 with outputs m21 and m22 of the multipliers $M_{21}$ and $M_{22}$ in accordance with a control signal SUG supplied from the timing control circuit 4.

Similarly, the matrix element calculating circuit M3 is formed by a switching circuit M3A, a delay circuit M3B which has the coefficient a1 ($=1$), a multiplier circuit M3C including two multipliers $M_{31}$ and $M_{32}$ having coefficients $a2=0.3$ and $a3=0.11$, and an adder/subtracter M3D.

The switching circuit M3A has three switches SW7, SW8, and SW9 (such as MOS switches), each of which is connected between an input terminal for the input signal EI3 and the ground terminal. The switches SW7, SW8, and SW9 are controlled by control-signals SB1, SB2, and SB3, respectively, supplied from the timing control circuit 4.

The adder/subtracter M3D performs an additional subtraction operation upon the input signal EI3 with outputs m31 and m32 of the multipliers $M_{31}$ and $M_{32}$ in accordance with a control signal SUB supplied from the timing control circuit 4.

Reference numeral 3 designates an output calculating circuit which includes adding/subtracting circuits 3A and 3B, a switching circuit SW10, and an output latch circuit 3D.

The adding/subtracting circuit 3A performs an adding/subtracting operation upon the matrix elements $d_1$ and $d_2$ obtained by the matrix element calculating circuits M1 and M2 in accordance with a control signal $S_{u1}$ supplied from the timing control circuit 4.

The adding/subtracting circuit 3B performs an adding/subtracting operation upon the output $d_{21}$ of the adding/subtracting circuit 3A and the output $d_{31}$ of the delay circuit 3C (i.e., the matrix element $d_3$ obtained by the matrix element calculating circuit M3) in accordance with a control signal $S_{u2}$ supplied from the timing control circuit 4.

The switching circuit SW10 is controlled by a control signal SW1 supplied from the timing control circuit 4, and as a result, the output latch circuit 3D generates three kinds of outputs continuously and in parallel.

For example, in the matrix element calculating circuit M1, if the control signals SR1, SR2, and SR3 supplied from the timing control circuit 4 indicate "a", "a", and "a", and the control signal SUR supplied from the timing control circuit 4 indicates "−", then $$d_1/EI1 = 1 - 0.3 - 0$$
$$= 0.7$$

Also, if the control signals SR1, SR2, and SR3 supplied from the timing control circuit 4 indicate "a", "a", and "b", and the control signal SUR supplied from the timing control circuit 4 indicates "−", then $$d_1/EI1 = 1 - 0.3 - 0.11$$
$$= 0.59$$

Further, if the control signals SR1, SR2, and SR3 supplied from the timing control circuit 4 indicate "a", "b", and "b", and the control signal SUR supplied from the timing control circuit 4 indicates "−", then $$d_1/EI1 = 1 - 0 - 0.11$$
$$= 0.89$$

Further, if the control signals SR1, SR2, and SR3 supplied from the timing control circuit 4 indicate "b", "b", and "b", and the control signal SUR supplied from the timing control circuit 4 indicates "+", then $$d_1/EI1 = 0.11 + 0 + 0$$
$$= 0.11$$

Further, if the control signals SR1, SR2, and SR3 supplied from the timing control circuit 4 indicate "b", "a", and "a", and the control signal SUR supplied from the timing control circuit 4 indicates "+", then $$d_1/EI1 = 0.3 - 0 - 0$$
$$= 0.3$$

In summary, the coefficients $a_{11}(a_{21}, a_{31})$ (matrix coefficients $= EI1/d_1$) are as shown in TABLE I.

TABLE I

| $a_{11}(a_{21}, a_{31})$ | SR1 | SR2 | SR3 | SUR |
|---|---|---|---|---|
| 0.7 | "a" | "a" | "a" | "−" |
| 0.59 | "a" | "a" | "b" | "−" |

TABLE I-continued

| $a_{11}(a_{21}, a_{31})$ | SR1 | SR2 | SR3 | SUR |
|---|---|---|---|---|
| 0.89 | "a" | "b" | "b" | "−" |
| 0.3 | "b" | "b" | "b" | "+" |
| 0.11 | "b" | "a" | "a" | "+" |

Similarly, the coefficients $a_{12}(a_{22}, a_{32})$ matrix coefficients = $EI2/d_2$) are as shown in TABLE II.

TABLE II

| $a_{12}(a_{22}, a_{32})$ | SG1 | SG2 | SG3 | SUG |
|---|---|---|---|---|
| 0.7 | "a" | "a" | "a" | "−" |
| 0.59 | "a" | "a" | "b" | "−" |
| 0.89 | "a" | "b" | "b" | "−" |
| 0.3 | "b" | "b" | "b" | "+" |
| 0.11 | "b" | "a" | "a" | "+" |

Also, the coefficients $a_{13}(a_{23}, a_{33})$ (matrix coefficients = $EI3/d_3$) are as shown in TABLE III.

TABLE III

| $a_{13}(a_{23}, a_{33})$ | SB1 | SB2 | SB3 | SUB |
|---|---|---|---|---|
| 0.7 | "a" | "a" | "a" | "−" |
| 0.59 | "a" | "a" | "b" | "−" |
| 0.89 | "a" | "b" | "b" | "−" |
| 0.3 | "b" | "b" | "b" | "+" |
| 0.11 | "b" | "a" | "a" | "+" |

The above-mentioned coefficients $a_{ij}$ can be represented by $$\begin{bmatrix} a_{11} & a_{12} & a_{13} \\ a_{21} & a_{22} & a_{23} \\ a_{31} & a_{32} & a_{33} \end{bmatrix}$$

Figure 4B:
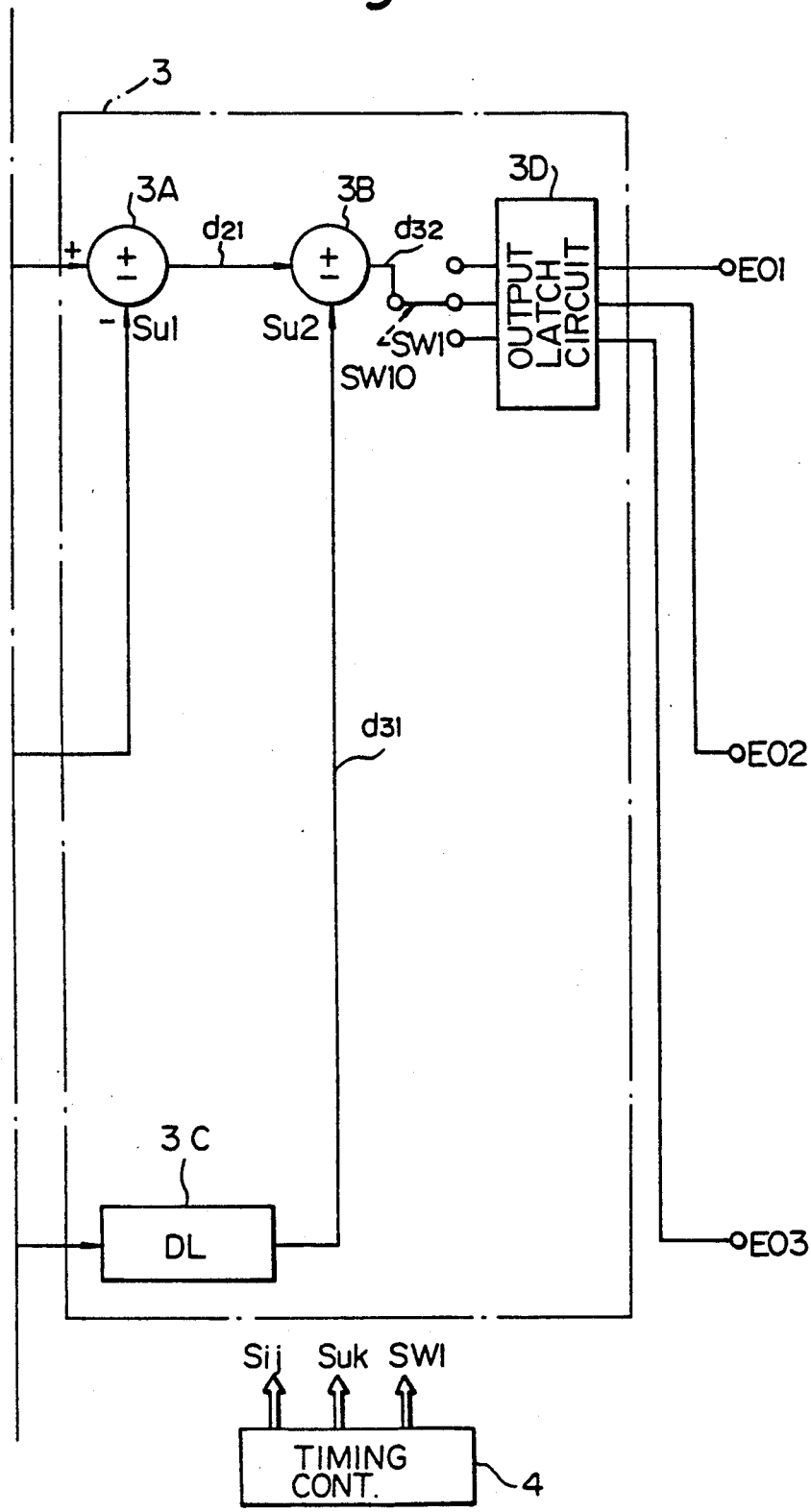
Figure 5B:
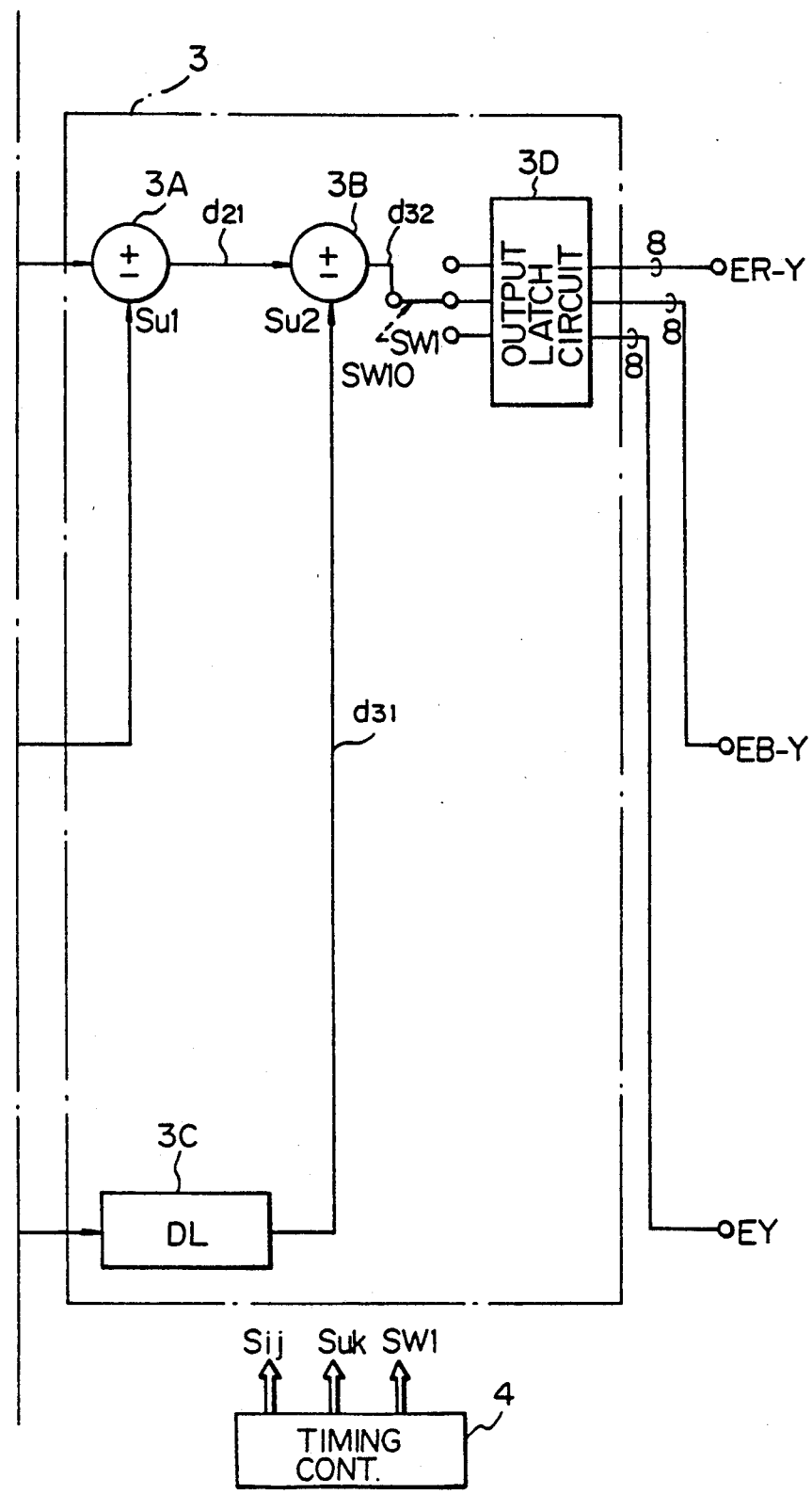

In FIGS. 5A and 5B, the matrix operation apparatus of FIGS. 4A and 4B is applied to a matrix operation apparatus for modulation in an NTSC transmitter. In FIGS. 5A and 5B, a red signal ER, a green signal EG, and a blue signal EB are used as the input signals EI1, EI2, and EI3, respectively, and a color difference signal ER-Y, a color difference signal EB-Y, and a brightness signal EY are used as the output signals E01, E02, and E03, respectively. The other references are the same as those of FIGS. 4A and 4B. The operation of the apparatus of FIGS. 5A and 5B will be explained with reference to FIGS. 6A through 6H.

When the color signals ER, EG, and EB (each of which are 8-bit data) are changed as shown in FIG. 6A, the control signals as shown in FIG. 6B are supplied from the timing control circuit 4 to the matrix element calculating circuits M1, M2, and M3, and the output calculating circuit 3. For example, for a time I,

| SR1 | "a" |
|---|---|
| SR2 | "a" |
| SR3 | "a" |
| SUR | "−" |
| SG1 | "a" |
| SG2 | "a" |
| SG3 | "b" |
| SUG | "−" |
| SB1 | "b" |
| SB2 | "b" |
| SB3 | "b" |
| SUB | "+" |
| SU1 | "+−" |

-continued

| SU2 | "+−" |
|---|---|

Figures 6C, 6D:
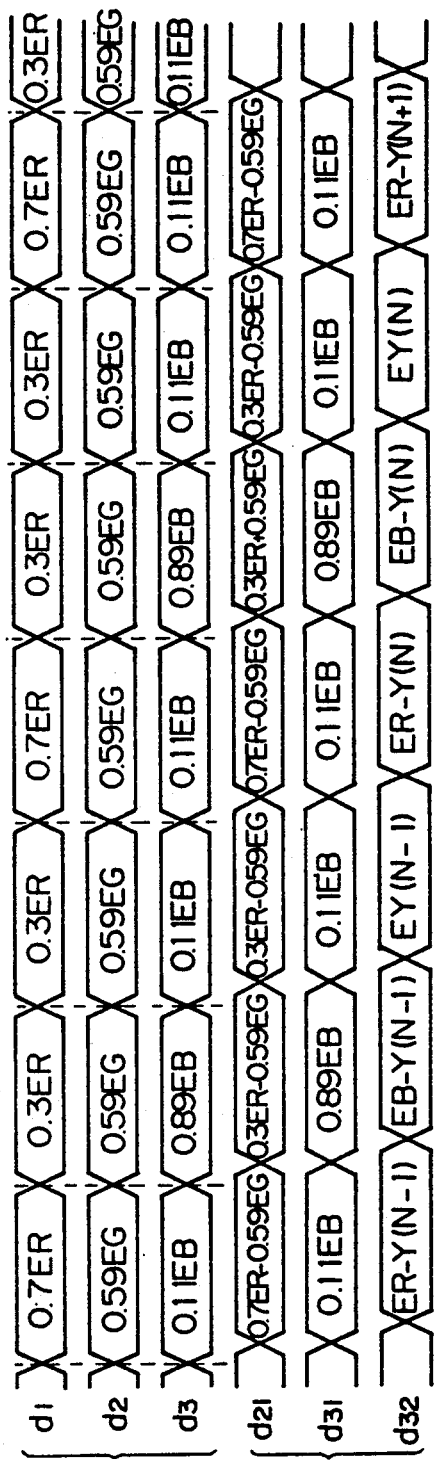

As a result, the matrix elements $d_1$, $d_2$, and $d_3$ are 0.7.ER, 0.59.EG, and 0.11.EB, respectively, as shown in FIG. 6C. Also, since "SU1" indicates "+−", the output $d_{21}$ of the adding/subtracting circuit 3A is 0.7.ER−0.59.EG, as shown in FIG. 6D. Thus, since "SU2" indicates "+−", the output $d_{32}$ of the adding/subtracting circuit 3B is ER-Y (N−1)=0.7.E$_4$−0.59.EG−0.11.EB, as shown in FIG. 6D.

Also, for a time II,

| SR1 | "b" |
|---|---|
| SR2 | "a" |
| SR3 | "a" |
| SUR | "+" |
| SG1 | "a" |
| SG2 | "a" |
| SG3 | "b" |
| SUG | "−" |
| SB1 | "a" |
| SB2 | "b" |
| SB3 | "b" |
| SUB | "−" |
| SU1 | "++" |
| SU2 | "++" |

As a result, the matrix elements $d_1$, $d_2$, and $d_3$ are 0.3.ER, 0.59.EG, and 0.89.EB, respectively, as shown in FIG. 6C. Also, since "SU1" indicates "++", the output $d_{21}$ of the adding/subtracting circuit 3A is 0.3.ER+0.59.EG, as shown in FIG. 6D. Thus, since "SU2" indicates "++", the output $d_{32}$ of the adding/subtracting circuit 3B is EB-Y (N−1)=0.3.E$_R$+0.59.EG+0.89.EB, as shown in FIG. 6D.

Further, for a time III,

| SR1 | "b" |
|---|---|
| SR2 | "a" |
| SR3 | "a" |
| SUR | "+" |
| SG1 | "a" |
| SG2 | "a" |
| SG3 | "b" |
| SUG | "−" |
| SB1 | "b" |
| SB2 | "b" |
| SB3 | "b" |
| SUB | "+" |
| SU1 | "+−" |
| SU2 | "++" |

As a result, the matrix elements $d_1$, $d_2$, and $d_3$ are 0.3.ER, 0.59.EG, and 0.11.EB, respectively, as shown in FIG. 6C. Also, since "SU1" indicates "+−", the output $d_{21}$ of the adding/subtracting circuit 3A is 0.3.ER−0.59.EG, as shown in FIG. 6D. Thus, since "SU2" indicates "++", the output $d_{32}$ of the adding/subtracting circuit 3B is EY (N−1)=0.3.E$_R$−0.59.EG+0.11.EB, as shown in FIG. 6D.

Thus, the adding/subtracting circuit 3B generates the data ER-Y, EB-Y, and EY in a time-divisional manner, as shown in FIG. 6E.

Since the control signal SW1 is supplied from the timing control circuit 4 to the switching circuit SW10 as shown in FIG. 6E, the data ER-Y, EB-Y, and EY are latched in the output latch circuit 3, and as a result, for a time defined by I', II', III', the color difference signals ER-Y (N−1) and EB-Y (N−1), and the brightness signal EY (N−1) are output continuously and in parallel, as shown in FIGS. 6F, 6G, and 6H.

Figure 7B:
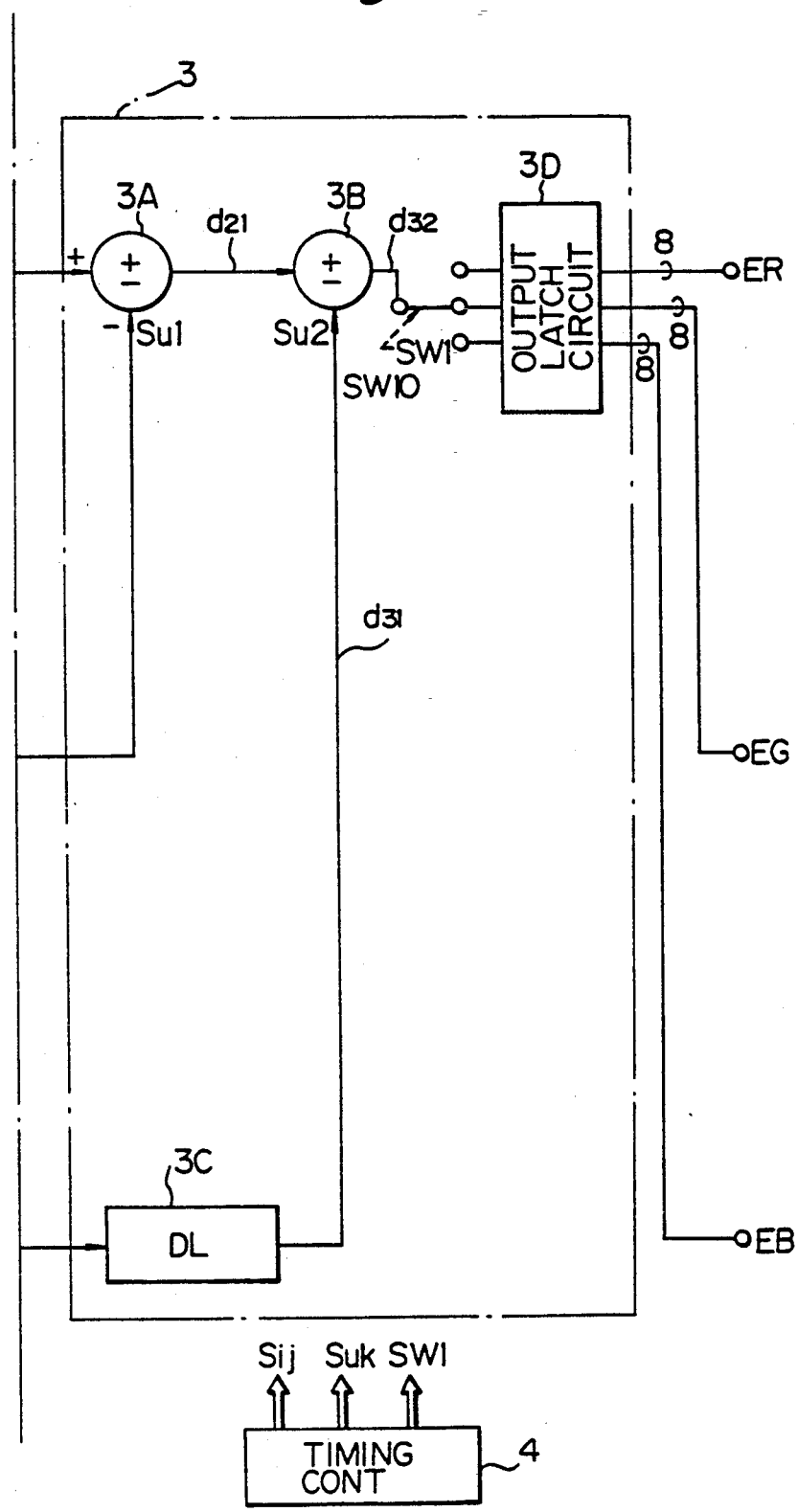

In FIGS. 7A and 7B, the matrix operation apparatus of FIGS. 4A and 4B is applied to an inverse-matrix operation apparatus for modulation in a NTSC receiver. In FIGS. 7A and 7B, a color difference signal ER-Y, a color difference signal EB-Y, and a brightness signal EY are used as the input signals EI1, EI2, and EI3, respectively, and a red signal ER, a green signal EG, and a blue signal EB are used as the output signals E01, E02, and E03, respectively. The other references are the same as those of FIG. 4.

The operation of the apparatus of FIGS. 7A and 7B will be explained with reference to FIG. 8A through 8H.

When the signals ER-Y, EB-Y, and EY (each of which are 8-bit data) are changed as shown in FIG. 8A, the control signals as shown in FIG. 8B are supplied from the timing control circuit 4 to the matrix element calculating circuits M1, M2, and M3, and the output calculating circuit 3. For example, for a time I,

| SR1 | "a" |
|---|---|
| SR2 | "a" |
| SR3 | "a" |
| SUR | "−" |
| SG1 | "b" |
| SG2 | "a" |
| SG3 | "a" |
| SUG | "+" |
| SB1 | "b" |
| SB2 | "a" |
| SB3 | "a" |
| SUB | "+" |
| SU1 | "+−" |
| SU2 | "++" |

As a result, the matrix elements $d_1$, $d_2$, and $d_3$ are 0.7.ER-Y, 0.3.EB-Y, and 0.3.EY, respectively, as shown in FIG. 8C. Also, since "SU1" indicates "+−", the output $d_{21}$ of the adding subtracting circuit 3A is 0.7.ER-Y−0.3.EB-Y, as shown in FIG. 8D. Thus, since "SU2" indicates "++", the output $d_{32}$ of the adding-/subtracting circuit 3B is ER (N−1)=0.7.ER-Y−0.3.EB-Y+0.3.EY, as shown in FIG. 8D. Also, for a time II,

| SR1 | "a" |
|---|---|
| SR2 | "a" |
| SR3 | "b" |
| SUR | "−" |
| SG1 | "a" |
| SG2 | "a" |
| SG3 | "b" |
| SUG | "−" |
| SB1 | "a" |
| SB2 | "a" |
| SB3 | "b" |
| SUB | "−" |
| SU1 | "− −" |
| SU2 | "++" |

As a result, the matrix elements $d_1$, $d_2$, and $d_3$ are 0.59.ER-Y, 0.59.EB-Y, and 0.59.EY, respectively, as shown in FIG. 8C. Also, since "SU1" indicates "− −", the output $d_{21}$ of the adding/subtracting circuit 3A is −0.59.ER-Y−0.59.EB-Y, as shown in FIG. 8D. Thus, since "SU2" indicates "++", the output $d_{32}$ of the adding/subtracting circuit 3B is EG (N−1)=−0.59.ER-Y−0.59.EB-Y+0.59.EY, as shown in FIG. 8D. Also, for a time III,

| SR1 | "b" |
|---|---|
| SR2 | "b" |
| SR3 | "b" |
| SUR | "+" |
| SG1 | "a" |
| SG2 | "b" |
| SG3 | "b" |
| SUG | "−" |
| SB1 | "b" |
| SB2 | "b" |
| SB3 | "b" |
| SUB | "+" |
| SU1 | "−+" |
| SU2 | "+−" |

As a result, the matrix elements $d_1$, $d_2$, and $d_3$ are 0.11.ER-Y, 0.89.EB-Y, and 0.11.EY, respectively, as shown in FIG. 8C. Also, since "SU1" indicates "−+", the output $d_{21}$ of the adding/subtracting circuit 3A is −0.11.ER-Y+0.89.EB-Y, as shown in FIG. 8D. Thus, since "SU2" indicates "+−", the output $d_{32}$ of the adding/subtracting circuit 3B is EB (N−1)=−0.11.ER-Y+0.89.EB-Y+0.11.EY, as shown in FIG. 8D.

Thus, the adding/subtracting circuit 3B generates the data ER, EG, and EB in a time-divisional manner, as shown in FIG. 8E.

Since the control signal SW1 is supplied from the timing control circuit 4 to the switching circuit SW10 as shown in FIG. 8E, the data ER, EG and EB are latched in the output latch circuit 3, and as a result, for a time defined by I', II', III', the color signals ER, EG, and EB are output continuously and in parallel, as shown in FIGS. 8F, 8G, and 8H.

In the above-mentioned embodiments, although the matrix operation apparatus according to the present invention is applied to a 3 rows and 3 columns matrix, the present invention can be applied to an n×n matrix where n is larger than 3.

Also, the matrix operation apparatus according to the present invention can be manufactured by a one-chip semiconductor device.

As explained above, according to the present invention, the matrix operation apparatus can be simplified, to reduce the manufacturing cost.

I claim:

1. A color signal matrix circuit for generating a plurality of output signals by modifying a plurality of input signals, using signal multiplier circuits comprising:

a plurality of color matrix signal element calculating means, each of said color matrix signal element calculating means receiving one of a plurality of color input signals and modifying each of said color input signals with a corresponding coefficient to obtain a color matrix signal element;

an output signal calculating means, operatively connected to said plurality of color matrix signal element calculating means, for adding/subtracting the color matrix signal elements obtained by said plurality of color matrix signal element calculating means to obtain one of said output signals; and a coefficient changing means, operatively connected to said plurality of color matrix signal element calculating means, for changing said coefficient;

said output signal calculating means being controlled by said coefficient changing means and thereby generating said plurality of output signals in a time-divisional manner, each of said matrix element calculating means including:

a plurality of signal switching circuits, each responsive to a control signal from the coefficient changing means for selectively coupling the corresponding color input signal or a ground level signal therethrough;

a plurality of signal multiplier circuits, each connected to a corresponding one of said switching circuits, for modifying an output signal of the corresponding switching circuit by a predetermined signal multiplier; and a signal adding/subtracting circuit, operatively connected to said signal multipliers and controlled by said coefficient changing means, for adding/subtracting the output signals of said signal multipliers.

2. An apparatus as set forth in claim 1, further comprising an output means, connected to said output calculating means, for converting said time-divisional output signals into parallel-continuous output signals.

3. An apparatus as set forth in claim 1, wherein said input signals are a red signal, a green signal, and a blue signal, said subcoefficients being 1, 0.3, and 0.11, said output signals being a color difference signal, a color difference signal, and a brightness signal, whereby said apparatus is applied to a matrix operation circuit for modulation in an NTSC system.

4. An apparatus as set forth in claim 1, wherein said input signals are a color difference signal, a color difference signal, and a brightness signal, said subcoefficients being 1, 0.3, and 0.11, said output signals being a red signal, a green signal, and a blue signal, whereby said apparatus is applied to an inverse matrix operation circuit for demodulation in a NTSC system.

5. An apparatus as set forth in claim 1, wherein said apparatus comprises a one-chip semiconductor device.

6. A color signal matrix circuit for converting red, green and blue color input signals to color difference output signals, or for converting color difference input signals to red, green and blue color output signals, the circuit comprising:

a plurality of color matrix signal element calculating means each including a plurality of corresponding color input signal switching means for selectively coupling a corresponding color input signal or a ground level signal therethrough, and each switching means being responsive to a first control signal from a control means; and an output signal calculating means, operatively connected to said plurality of color matrix signal element calculating means and responsive to a second control signal from said control means, for adding/subtracting the color matrix signal elements obtained by said plurality of color matrix signal element calculating means to obtain one of said output signals.

7. The circuit of claim 6 wherein each of said plurality of color matrix signal element calculating means further comprises:

a plurality of signal multiplier circuits, each connected to a corresponding one of said switching means, for modifying an output signal of the corresponding switching means by a predetermined signal multiplier; and signal adding/subtracting means, operatively connected to said signal multipliers and controlled by said control means, for adding/subtracting output signals from said signal multipliers.

* * * * *

UNITED STATES PATENT AND TRADEMARK OFFICE
CERTIFICATE OF CORRECTION

PATENT NO. : 5,313,274
DATED : May 17, 1994
INVENTOR(S) : Abe

It is certified that error appears in the above-indentified patent and that said Letters Patent is hereby corrected as shown below:

Column 3, line 9, delete "131T" and insert --131I--.

Column 8, line 11, delete "$E_4$", and insert --$E_R$--.

Column 8, lines 11-12, delete ".5-9" and insert --.59--.

Column 8, lines 35-36, delete ".5-9" and insert --.59--.

Column 8, lines 58-59, delete ".5-9" and insert --.59--.

Signed and Sealed this

Fourth Day of April, 1995

BRUCE LEHMAN

Attest:

Attesting Officer

Commissioner of Patents and Trademarks